(12) United States Patent
Doh et al.

(10) Patent No.: US 7,277,632 B2
(45) Date of Patent: Oct. 2, 2007

(54) METHOD FOR ASSIGNING WAVELENGTHS IN WAVELENGTH DIVISION MULTIPLEXING RING COMMUNICATION NETWORK

(75) Inventors: Sang-Hyun Doh, Kyonggi-do (KR); Yun-Je Oh, Yongin-shi (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 695 days.

(21) Appl. No.: 10/619,694

(22) Filed: Jul. 15, 2003

(65) Prior Publication Data

US 2004/0028410 A1 Feb. 12, 2004

(30) Foreign Application Priority Data

Jul. 27, 2002 (KR) .................... 10-2002-0044403

(51) Int. Cl.
*H04B 10/00* (2006.01)
(52) U.S. Cl. .................... 398/3; 398/7; 398/59; 398/79
(58) Field of Classification Search .................... 398/7, 398/17, 42, 68, 79, 3, 4, 59, 69
See application file for complete search history.

(56) References Cited

U.S. PATENT DOCUMENTS 5,963,348 A * 10/1999 Oberg ........................... 398/5
5,999,288 A * 12/1999 Ellinas et al. ................. 398/59

FOREIGN PATENT DOCUMENTS

JP 2002-502185 1/2002

* cited by examiner

*Primary Examiner*—Christina Leung
(74) *Attorney, Agent, or Firm*—Cha & Reiter, L.L.C.

(57) ABSTRACT

A method for assigning a predetermined wavelength between two different nodes in a wavelength division multiplexing (WDM) ring communication network that has an N number of nodes and at least one pair of optical fibers sequentially connecting the N number of nodes is disclosed. A matrix is formed by an algorithm representing optical-path configuration and wavelength assignment for nodes representing three cases: (1) when the number of nodes is an even number; (2) when the number of nodes is increased; and (3) for recovery from network-cut failures.

4 Claims, 5 Drawing Sheets

[TABLE 11]

|     | A | B   | C   | D   | E   | I | F | G | H |
|-----|---|-----|-----|-----|-----|---|---|---|---|
| W1  | 1 | 4→4 | X   | X   | X   | 1 | 3 | X | X |
| W2  | 2 | X   | 3→4 | X   | X   | X | 1 | 2 | X |
| W3  | 3 | X   | X   | 2→3 | X   | X | 2 | X | 1 |
| W4  | X | 1   | 4→3 | X   | X   | 2 | X | 3 | X |
| W5  | X | 2   | X   | 3→4 | X   | X | X | 1 | 2 |
| W6  | X | X   | 1   | 4→2 | X   | 3 | X | X | 3 |
| W7  | X | 3   | X   | X   | 1→2 | X | 4 | X | X |
| W8  | X | X   | 2   | X   | 2→3 | X | X | 4 | X |
| W9  | X | X   | X   | 1   | 3→4 | X | X | X | 4 |
| W10 | 4 | X   | X   | X   | 4→1 | 4 | X | X | X |

[TABLE 11]

|  | A | B | C | D | E | I | F | G | H |
|---|---|---|---|---|---|---|---|---|---|
| W1 | 1 | 4→4 | X | X | X | 1 | 3 | X | X |
| W2 | 2 | X | 3→4 | X | X | X | 1 | 2 | X |
| W3 | 3 | X | X | 2→3 | X | X | 2 | X | 1 |
| W4 | X | 1 | 4→3 | X | X | 2 | X | 3 | X |
| W5 | X | 2 | X | 3→4 | X | X | X | 1 | 2 |
| W6 | X | X | 1 | 4→2 | X | 3 | X | X | 3 |
| W7 | X | 3 | X | X | 1→2 | X | 4 | X | X |
| W8 | X | X | 2 | X | 2→3 | X | X | 4 | X |
| W9 | X | X | X | 1 | 3→4 | X | X | X | 4 |
| W10 | 4 | X | X | X | 4→1 | 4 | X | X | X |

METHOD FOR ASSIGNING WAVELENGTHS IN WAVELENGTH DIVISION MULTIPLEXING RING COMMUNICATION NETWORK

CLAIM OF PRIORITY

This application claims priority to an application entitled "METHOD FOR ASSIGNING WAVELENGTHS IN WAVELENGTH DIVISION MULTIPLEXING RING COMMUNICATION NETWORKS," filed in the Korean Intellectual Property Office on Jul. 27, 2002 and assigned Serial No. 2002-44403, the contents of which are hereby incorporated by reference.

BACKGROUND OF THE INVENTION

1. Field of the Invention

The present invention relates to an optical communication network, and more particularly to a method of setting-up optical paths and assigning wavelengths with a minimum number of wavelengths in a wavelength division multiplexing (WDM) ring communication network.

2. Description of the Related Art

An optical ring network using a wavelength division multiplexing (WDM) is a network topology that is popular because of its easiness of establishing a network. It is also has the additional advantages of being able to swiftly recover from network-cut failures and its low start-up cost. This has led to the increased worldwide use WDM ring networks.

Conventional WDM ring communication networks provide every node forming part of the network with full-mesh connectivity. Such optical ring networks use wavelengths from two optical fibers in order to form optical paths between each two nodes. The two optical fibers include both a forward-direction optical fiber link through which an optical signal travels in the clockwise direction and a backward-direction optical fiber link through which an optical signal travels in the counterclockwise direction.

When the optical rink network is established, the setting of optical paths is performed, considering facts such as swift recovery from network-cut failures, the number of wavelengths required to realize full-mesh connectivity network, and network extensions.

The set-up process usually gives particular attention to configuring optical paths and assigning wavelengths with a minimum number of wavelengths. In such a process, a network with full-mesh connectivity can be established with a smaller number of wavelengths, and therefore the network can have a larger transmission capacity. Although, when new nodes are added to such an optical ring network, it is necessary to minimize change of the configuration of the already-existing network in forming optical paths between nodes.

FIG. 1 is a block diagram showing a ring communication network 10 including five nodes 11-15 with full-mesh connectivity. In such a communication network with full-mesh connectivity, an optical path must be provided between any two nodes. The ring communication network 10 includes a pair of optical links. One optical link is a forward-direction optical fiber link through which an optical signal travels in the clockwise direction, and the other is a backward-direction optical fiber link through which an optical signal travels counterclockwise direction. A number of channels are multiplexed in each optical fiber link using a wavelength division multiplexing method.

In the ring communication network 10, it is necessary to minimize the number of wavelengths required for achieving full-mesh connectivity. Accordingly, a method of forming optical paths using a minimum allowable number of wavelengths and a method of assigning wavelengths to each optical path should be used. In addition, when wavelengths are assigned to each optical path in the ring communication network 10, it is necessary that optical paths sharing the same optical fiber link not use the same wavelength.

To accomplish this, a lower limit value of the number of wavelengths required to configure the ring communication network 10 must be determined. This is assuming that the optical path formed between two nodes is the shortest possible path there between. In this regard, referring again to FIG. 1, an optical path from a node 1 to a node 3 is not formed in the counterclockwise direction, but in the clockwise direction. This method of forming the optical path is reasonable because it utilizes available resources optimally. Under this assumption, the following facts can be obtained. First, the maximum distance Lmax between any two nodes is (N−1)/2 when N is an odd number, and N/2 when N is an even number. Here, the term "distance" means the number of "hops", i.e., the number of nodes between any two nodes, and therefore the distance between two neighboring nodes becomes 1.

There are many ways of expressing optical paths formed between each two nodes, for an example, a matrix expression method proposed by Ellinas is used in the following description of the optical paths (See, e.g., G. Ellinas, K. Bala and G.-K. Chang, "A Novel Wave-length Assignment Algorithm for 4-fiber WDM Self-Healing Rings," *Proc. of ICC '98*, 1998, pp. 197-201.)

FIG. 2 is a block diagram of a conventional method for assigning wavelengths in a ring communication network 20 including four nodes 21-24. In this configuration, when the number of nodes is 4, the maximum distance is 2. An optical path 25 may be formed between a node 1 and node 3 using a wavelength W1 in the clockwise direction, and an optical path 26 may be formed between a node 2 and a node 4 using the same wavelength W1 in the counterclockwise direction.

In the case where the number of nodes is an even number and not a multiple of 4, (the number of nodes becomes a multiple of 4 if two nodes are not considered), the number of wavelengths required in such a case can be obtained by adding one to the number of wavelengths required when the number of nodes is a multiple of 4. Accordingly, when an optical path is formed between each two nodes using the shortest path, the minimum number of wavelengths required is (N2−1)/8 when the number of nodes N is an odd number, N2/8 when the number of nodes N is an even number and a multiple of 4, and (N2+4)/8 when the number of nodes N is an even number but not a multiple of 4.

However, these calculations do not consider a requirement in forming the optical paths that optical paths sharing the same optical fiber link must have different wavelengths, and therefore the values obtained by the calculations are a lower limit value of the required number of wavelengths.

FIG. 3 is a block diagram a conventional method for assigning wavelengths in a ring communication network 30 including five nodes 31-35. In FIG. 3, an optical path 36 is formed from nodes {A, B, D} to nodes {B, D, A}, using a wavelength W2, and the optical path 36 may be expressed by a matrix in the following table 1.

TABLE 1

|    | A | B | C | D | E |
|----|---|---|---|---|---|
| W2 | 1 | 2 | X | 2 | X |

In table 1, each numeral indicates a length of the corresponding optical path (the number of hops between two nodes). Accordingly, "1" in the first column means that an optical path is formed from the node A to the node B, and "2" in the second column means that an optical path is formed from the node B to the node D. "X" in the third column means that no optical path is formed, starting from the node C using the wavelength W2. In such a manner, optical paths formed using each wavelength can be easily expressed. The matrix of expressing the formed optical paths has the following requirements. One requirement is related to the row and the other the column.

Requirement in the Row

1. When there is a numeral "K" in a position (i, j), only X exists between positions (i, j) and (i, (j+K) mod N). This requirement means that when optical paths share the same optical fiber link, they cannot use the same wavelength.

2. The summation of all values in one row is N. This requirement means that utilization of a given number of wavelengths should be optimized.

Requirement in the Column

1. There is no same value in one column. Existence of the same value means that a plurality of optical paths is formed between two nodes. Therefore, in order to minimize the minimum number of wavelengths, one column should have no two values the same.

2. One column should have all values, from 1 to Lmax. Here, Lmax denotes the maximum distance. This means that full-mesh connectivity should be satisfied. However, this requirement is satisfied only when the number of nodes is an odd number, and may not be satisfied in some matrixes when the number of nodes is an even number. In particular, in this case, the two most-distant nodes to be connected by an optical path formed in one optical fiber link may be also connected by another optical path formed in the opposite optical fiber link, and therefore the optical path interconnecting the most-distant nodes may not be formed in the one optical fiber link. However, this requirement should be satisfied when the number of nodes is an odd number.

Accordingly, when the optical paths are expressed with a matrix, such requirements can be used to check whether the wavelengths are assigned suitably.

The wavelength assignment method proposed by Ellinas may be classified into three cases: (I) when the number of nodes is an odd number, (II) when it is an even number, and (III) when the number of nodes is increased.

I. The Wavelength Assignment Method when the Number of Nodes is an Odd Number

The method for assigning wavelengths when the number of nodes is an odd number may be expressed by a matrix as follows.

1. A matrix is prepared where the number of columns is equal to the number of nodes, and the number of rows is equal to the lower limit value of the number of wavelengths required when the number of nodes is N.

2. A set of numerals {1, 2 . . . Lmax} are sequentially assigned to locations of the first column. "X" is written in each empty locations of the first column, assigned no numeral. When a numeral is assigned to a location in the first column, a number of X's equal to the hop number represented by the numeral minus 1 are written in locations to the right of the numeral and in the same row as the numeral.

3. A set of numerals {Lmax, 1 . . . 2}, obtained by rotating the set of numerals {1, 2 . . . Lmax} used in the first column, are sequentially assigned to locations of the second column. However, no numeral is assigned to locations in the second column where "X" is already written. In addition, "X" is assigned to empty locations of the second column.

4. In the same manner, a set of values, obtained by rotating the used set, are assigned to locations of the next columns, and "X" is assigned to empty locations with no numeral assigned. This procedure is repeated until the matrix is completed.

Illustratively, when this method is applied to a ring communication network having 7 nodes (i.e., N=7). Because N is 7, the number W of wavelengths is $(7^2-1)/8=6$, and the maximum distance is $(7-1)/2=3$. The following table 2 shows a completed matrix in such a case.

TABLE 2

|    | A | B | C | D | E | F | G |
|----|---|---|---|---|---|---|---|
| W1 | 1 | 3 | X | X | 3 | X | X |
| W2 | 2 | X | 2 | X | 1 | 2 | X |
| W3 | 3 | X | X | 1 | 2 | X | 1 |
| W4 | X | 1 | 3 | X | X | 3 | X |
| W5 | X | 2 | X | 2 | X | 1 | 2 |
| W6 | X | X | 1 | 3 | X | X | 3 |

As shown in table 2, a set of numerals {1, 2, 3} are assigned to locations of the first column, and a rotated set of numerals {3, 1, 2} are assigned to locations of the second column. The reason why no numeral is assigned to the second and third rows of the second column is that numerals 2 and 3 are assigned to their previous columns (the first column), respectively, and this means that the corresponding wavelengths are already used there.

II. The Wavelength Assignment Method when the Number of Nodes is an Even Number

When the number of modes is an even number, the above-mentioned method cannot be used. Instead, after the wavelength assignment method is performed for a communication network including an odd number (N−1) of nodes, the number of nodes is increased. However, there is a little difference in this method between the case where the number of nodes is a multiple of 4 and the other cases.

II-1. The Wavelength Assignment Method when the Number of Nodes is an Even Number and Also a Multiple of 4

1. A matrix expressing the wavelength assignment in the case where the number of nodes is N−1 is formed.

2. A column is added at any position, extending the number of columns.

3. Tracking to the left from the added column, a first encountered numeral for each row is selected. That is, for each row, a numeral on the left nearest to the added column is selected.

3-1. If the value of the selected numeral is not Lmax, the value is increased by 1, and "X" is written in the corresponding row of the added column.

3-2. If the value is Lmax, the value is decreased by q, and "(q+1)" is written in the corresponding location (row) of the added column. Here, q represents the number of Xs that are passed by when tracking to the right from the added column until a first numeral is encountered. That is, q means the number of Xs that exist between the added column and a numeral on the right nearest to the added column.

3-3. A number of new rows equal to (N/4) are added, and longest optical paths having the maximum distance are formed using the new wavelengths corresponding to the added rows.

Illustratively, when such this method is applied to a communication network having 8 nodes, the following table 3 is obtained. In table 3, a node E is added between nodes D and F.

TABLE 3

|    | A | B     | C     | D     | E | F | G | H |
|----|---|-------|-------|-------|---|---|---|---|
| W1 | 1 | 3 → 3 | X     | X     | 1 | 3 | X | X |
| W2 | 2 | X     | 2 → 3 | X     | X | 1 | 2 | X |
| W3 | 3 | X     | X     | 1 → 2 | X | 2 | X | 1 |
| W4 | X | 1     | 3 → 2 | X     | 2 | X | 3 | X |
| W5 | X | 2     | X     | 2 → 3 | X | X | 1 | 2 |
| W6 | X | X     | 1     | 3 → 1 | 3 | X | X | 3 |
| W7 | 4 | X     | X     | X     | 4 | X | X | X |
| W8 | X | X     | 4     | X     | X | X | 4 | X |

Referring to the first row of the matrix of table 3, the numeral on the left nearest to the added column E is 3, Lmax, and thus the value of the nearest numeral on the left is not increased. In addition, the number q of Xs on the right before the right-nearest numeral 3 is 0. Therefore, the value keeps its original value 3, and the value of the first row of the added column E keeps its original value 1. The same method is applied to the second through sixth row. Because N is 8, the number of added wavelengths is 2. The longest optical paths are formed by selecting any two nodes. In this case, a wavelength W7 is used for forming an optical path (nodes A → E, nodes E → A), and a wavelength W8 is used for forming an optical path (nodes C → G, nodes G → C). An optical fiber link in the opposite-direction is used for forming both optical paths between nodes B and F, and between nodes D and H, using wavelengths W7 and W8.

II-2. The Wavelength Assignment Method when the Number of Nodes is an Even Number and Not a Multiple of 4

1. This method is the same as the method used for the case where the number of nodes is a multiple of 4, but the following difference exists in the procedure of assigning wavelengths to the longest optical paths (with the maximum distance) using the added wavelengths.

2. When wavelengths are assigned to the longest optical paths, an added wavelength is used for each four nodes and the other wavelength is used for the other two nodes. In this case, the used wavelength remains unused in the opposite-direction optical fiber link.

Illustratively, when this method is applied to a communication network having 6 nodes, the following table 4 is obtained. In table 4, a node D is added between nodes C and E.

TABLE 4

|    | A | B     | C     | D | E | F |
|----|---|-------|-------|---|---|---|
| W1 | 1 | 2 → 2 | X     | 1 | 2 | X |
| W2 | 2 | X     | 1 → 2 | X | 1 | 1 |
| W3 | X | 1     | 2 → 1 | 2 | X | 2 |
| W4 | 3 | X     | X     | 3 | X | X |
| W5 | X | X     | 3     | X | X | 3 |

Because the number of nodes is 6, four nodes are considered as one group, and two nodes are considered as the other group. In table 4, nodes A, B, C, D and E are considered as one group, and nodes C and F are considered as the other group. A wavelength W4 is used in optical paths A → D, D → A, and optical paths E → B, B → E are formed through the opposite-direction optical fiber link. A wavelength W5 is used in optical paths C → F, F → C, and the wavelength W5 is not used in the opposite-direction optical fiber link.

As mentioned above, the conventional method of assigning wavelengths is simple, but provides only a static method. Of course, it is possible to change the configuration of the method such that the rows are exchanged in the matrix, or rotation of the column is performed with the nodes fixed, but this modified configuration is also inevitably limited to a specific form.

III. The Wavelength Assignment Method when the Number of Nodes is Increased

First, a wavelength assignment is performed according to the above-mentioned method so as to achieve full-mesh connectivity in a ring communication network with any number of nodes. Thereafter, when a node is added at any position, a communication network is configured to have full-mesh connectivity with a minimum number of wavelengths while minimizing the change of the already-existing communication network.

When the number of the nodes is increased from an odd number to an even number, the above-mentioned method is applied; it is found that even when the number of nodes is increased, a minimum number of wavelengths may be used. Before the increase of the number of nodes, the wavelength W1 is used for forming an optical path from the node B to the node F. However, after the increase of the number of nodes, because the nodes are changed such as node B → node E, node E → node F, a modification is needed in the nodes B and F of the already-existing communication network. However, regarding the wavelength W2, the optical path from the node C to the node F is not changed even after the increase of the number of nodes. Accordingly, when the number of nodes is increased in such a method, it is necessary to change the corresponding nodes regarding the wavelengths W1, W4, and W6. When the number of nodes is increased from an even number to an odd number, the method for assigning wavelengths using a matrix is as follows.

1. A new column is added in a position where a node is added, and the number of rows is also increased by the number of wavelengths that is needed to be added due to the increase of the number of columns.

2. The already-used wavelengths are processed using the same method as applied to the already-used wavelengths in the case where the number of nodes is increased from an even number to an odd number.

3. Each column of a new row corresponding to the new wavelength is assigned a numeral, if any, not used in the same column, and if not, it is assigned "X".

When this method is applied to a communication network where the number of nodes N is increased from 6 to 7, a matrix represented by the following table can be obtained. In this example, a node D is added between a node C and a node E.

TABLE 5

|    | A     | B     | C     | D | E | F | G |
|----|-------|-------|-------|---|---|---|---|
| W1 | 1     | 1     | 2 → 3 | X | X | 2 | X |
| W2 | 2     | X     | 1 → 2 | X | 1 | 1 | 1 |
| W3 | X     | 2 → 3 | X     | X | 2 | X | 2 |
| W4 | 3 → 3 | X     | X     | 1 | 3 | X | X |

TABLE 5-continued

|    | A | B | C     | D | E | F | G |
|----|---|---|-------|---|---|---|---|
| W5 | X | X | 3 → 1 | 3 | X | X | 3 |
| W6 | X | 2 | X     | 2 | X | 3 | X |

In table 5, when the number of nodes N is 7, the lower limit value of the number of wavelengths is 6, and therefore one row is added. In the row of wavelength W1, a numeral on the left nearest to the column D is 2, and therefore the nearest numeral is modified to 3. In the row of wavelength W5, the nearest numeral is 3, Lmax, and therefore it cannot be modified to 4. Instead, because the number of Xs that exist between the added column D and a numeral on the right nearest to the added column D is 2, its value is reduced to 1, and 3 is written in the new added column D of the row of W5. In addition, because one of each of the three numerals 1, 2, 3 must exist in each column to achieve full-mesh connectivity, each column of the row of the added wavelength W6 is assigned a numeral if the numeral does not exist in the corresponding column, and is assigned "X" if all three numerals exist in the corresponding column. The matrix is completed by such a procedure. Here, it is found that it is necessary to modify the already-existing communication network with respect to wavelengths W4 and W5.

For reference, the following tables 6 through 9 show the results of Ellinas' wavelength assignment in the case where the number of nodes is increased from 5 to 8. "<W>" shown in the following tables indicates that an optical path corresponding to a wavelength W is changed by the addition of a new node.

TABLE 6

Ellinas' wavelength assignment method when the number of nodes is 5

|    | A | B | F | G | H |
|----|---|---|---|---|---|
| W1 | 1 | 2 | X | 2 | X |
| W2 | 2 | X | 1 | 1 | 1 |
| W3 | X | 1 | 2 | X | 2 |

TABLE 7

Ellinas' wavelength assignment method when the number of nodes is 6
(Node C is added between nodes B and F)

|       | A | B | C | F | G | H |
|-------|---|---|---|---|---|---|
| <W1>  | 1 | 1 | 2 | X | 2 | X |
| <W2>  | 2 | X | 1 | 1 | 1 | 1 |
| W3    | X | 2 | X | 2 | X | 2 |
| W4    | X | X | 3 | X | X | 3 |
| W5    | 3 | X | X | 3 | X | X |

TABLE 8

Ellinas' wavelength assignment method when the number of nodes is 7
(Node D is added between nodes C and F)

|    | A | B | C | D | F | G | H |
|----|---|---|---|---|---|---|---|
| W1 | 1 | 1 | 3 | X | X | 2 | X |
| W2 | 2 | X | 2 | X | 1 | 1 | 1 |
| W3 | X | 3 | X | X | 2 | X | 2 |

TABLE 8-continued

Ellinas' wavelength assignment method when the number of nodes is 7
(Node D is added between nodes C and F)

|       | A | B | C | D | F | G | H |
|-------|---|---|---|---|---|---|---|
| <W4>  | X | X | 1 | 3 | X | X | 3 |
| <W5>  | 3 | X | X | 1 | 3 | X | X |
| W6    | X | 2 | X | 2 | X | 3 | X |

TABLE 9

Ellinas' wavelength assignment method when the number of nodes is 8
(Node E is added between nodes D and F)

|       | A | B | C | D | E | F | G | H |
|-------|---|---|---|---|---|---|---|---|
| <W1>  | 1 | 1 | 2 | X | 2 | X | 2 | X |
| W2    | 2 | X | 3 | X | X | 1 | 1 | 1 |
| <W3>  | X | 3 | X | X | 1 | 2 | X | 2 |
| <W4>  | X | X | 1 | 1 | 3 | X | X | 3 |
| W5    | X | X | X | 2 | X | 3 | X | X |
| W6    | X | 2 | X | 3 | X | X | 3 | X |
| W7    | 4 | X | X | X | 4 | X | X | X |
| W8    | X | X | 4 | X | X | X | 4 | X |

As mentioned above, the conventional method of assigning wavelengths in a WDM ring communication network has an advantage in that an optical path between two respective nodes and a wavelength to be assigned to each optical path can be determined easily and systemically using a matrix. However, the conventional method has a problem that there is only provided a static type method of assigning wavelengths, thereby reducing flexibility in implementing a communication network.

Accordingly, there is a need in the art for an improved method of assigning wavelengths in a WDM ring communication network.

SUMMARY OF THE INVENTION

Therefore, the present invention has been made in view of the above problem, and it is an object of the present invention to provide a method of assigning wavelengths in a wavelength division multiplexing ring communication network wherein optical paths are set and wavelengths are assigned using a minimum number of wavelengths.

It is another object of the present invention to provide a method of assigning wavelengths in a wavelength division multiplexing ring communication network which allows forming of optical paths between each two nodes with a minimum number of wavelengths, while minimizing change of the configuration of the already-existing communication network when a node is added to the already-existing communication network.

In accordance with one aspect of the present invention, a method for assigning a predetermined wavelength between two different nodes in a wavelength division multiplexing ring communication network that has an N number of nodes and at least one pair of optical fibers sequentially connecting the N number of nodes is provided. The method includes the steps of:

forming a matrix that represents optical-path configuration and wavelength assignment for an N−1 number of nodes;

extending the matrix by adding a column at any position of the matrix and then assigning X to locations of the added column;

adding an N/2 number of rows in the matrix;

tracking along each row toward the left, from the added column, to find a firstly encountered numeral and increasing the found numeral by one;

assigning numerals 1, 2, . . . , N/2 sequentially to locations corresponding to the added column in the added rows, and assigning X to locations next to the numeral-assigned locations, the number of X-assigned locations being equal to a hop-number corresponding to the assigned numeral minus 1; and tracking along each of the added rows toward the right to find an empty location and assign thereto a numeral not used in the same column as the empty location, among the numerals 1, 2, . . . , N/2, and assigning X to locations next to the empty location, the number of X-assigned locations being equal to a hop-number corresponding to the assigned numeral minus 1, where N represents an even number and X representing that an optical path of the corresponding node is not formed.

In accordance with another aspect of the present invention, a method for assigning a predetermined wavelength between two different nodes, in a case where the number of nodes is increased, in a wavelength division multiplexing ring communication network that has an N number of nodes and at least one pair of optical fibers sequentially connecting the N number of nodes is provided. The method includes the steps of:

expressing, by a matrix, optical-path configuration and wavelength assignment of the network before extending the number of nodes;

extending the matrix by adding a column to extend the number of nodes at a corresponding position of the matrix and then assigning X to the added column;

tracking along each row toward the left, from the added column, to find a firstly encountered numeral and increasing the found numeral by one, and, if the numeral exceeds a maximum number of hops (Lmax=(N−1)/2)) after being increased, modifying the numeral to a hop-number from a column corresponding to the firstly-encountered numeral to the added column;

tracking along each row toward the right, from the added column, to find a firstly encountered numeral and assigning, to each row of the added column, a hop-number from the added column to a column corresponding to the firstly-encountered numeral; and assigning X to an empty location of the added column, where N represents an odd number and X representing that an optical path of the corresponding node is not formed.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
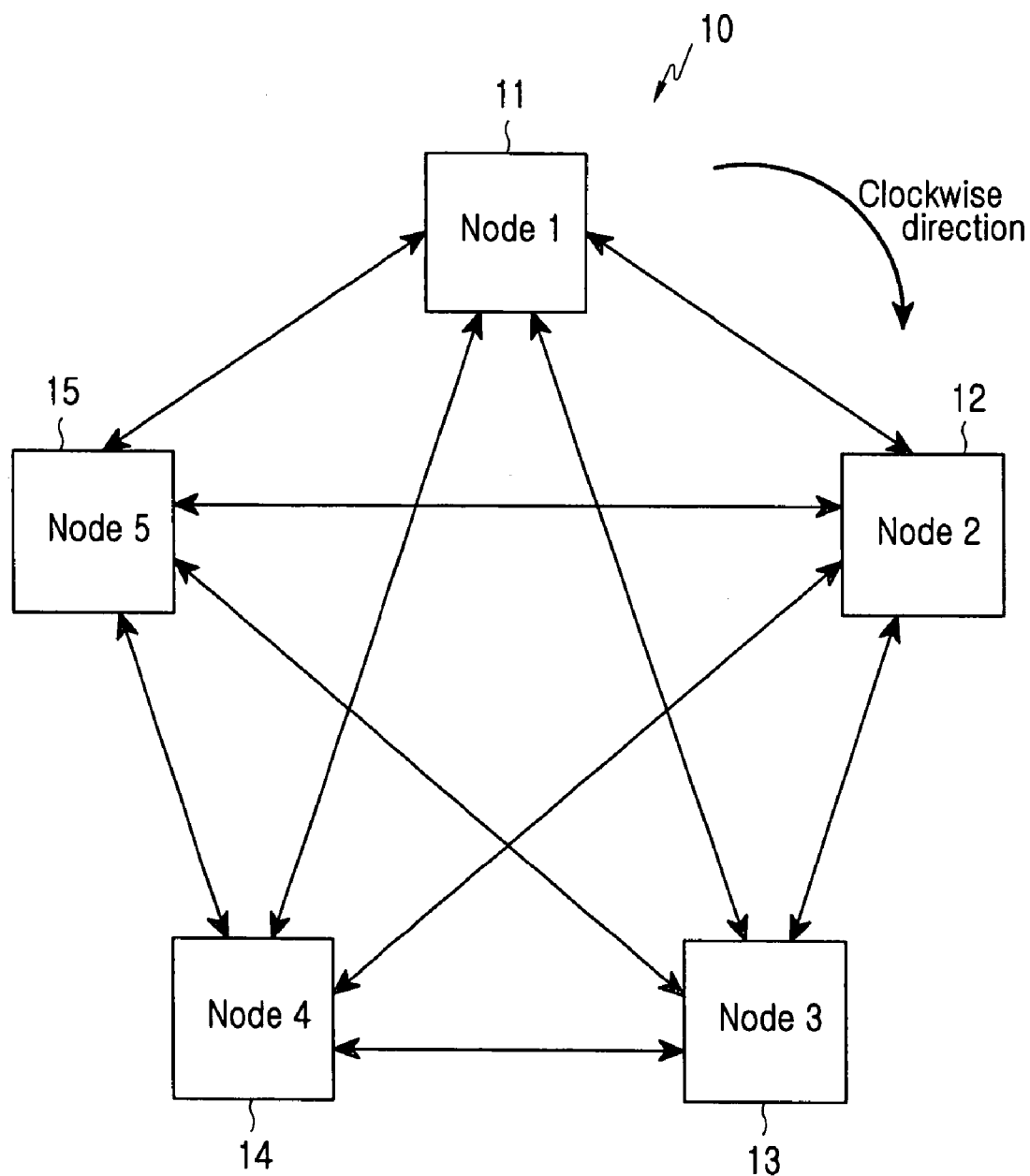
FIG. 1 is a block diagram showing a conventional ring communication network including five nodes with full-mesh connectivity.
Figure 2:
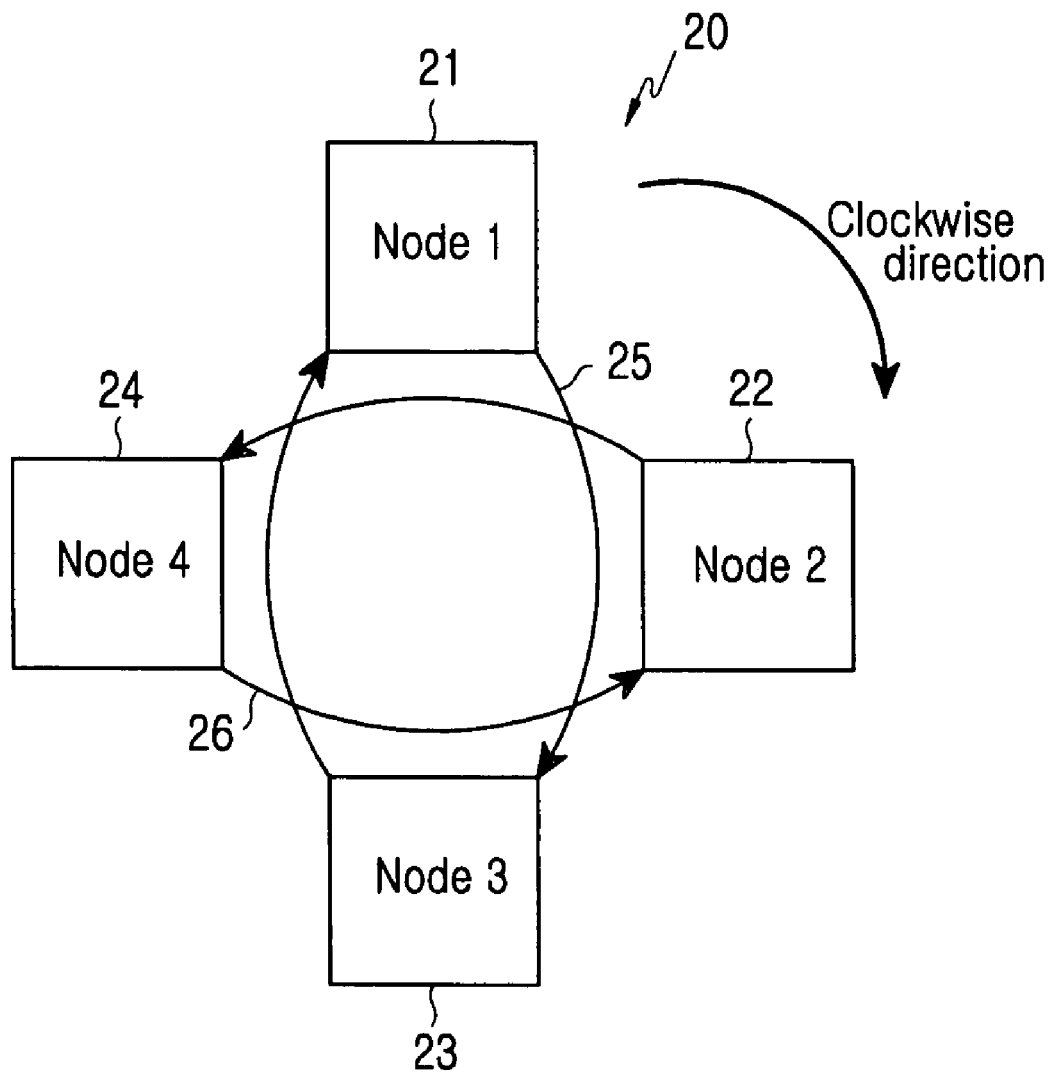
FIG. 2 is a block diagram illustrating a conventional method for assigning wavelengths in a ring communication network including four nodes.
Figure 3:
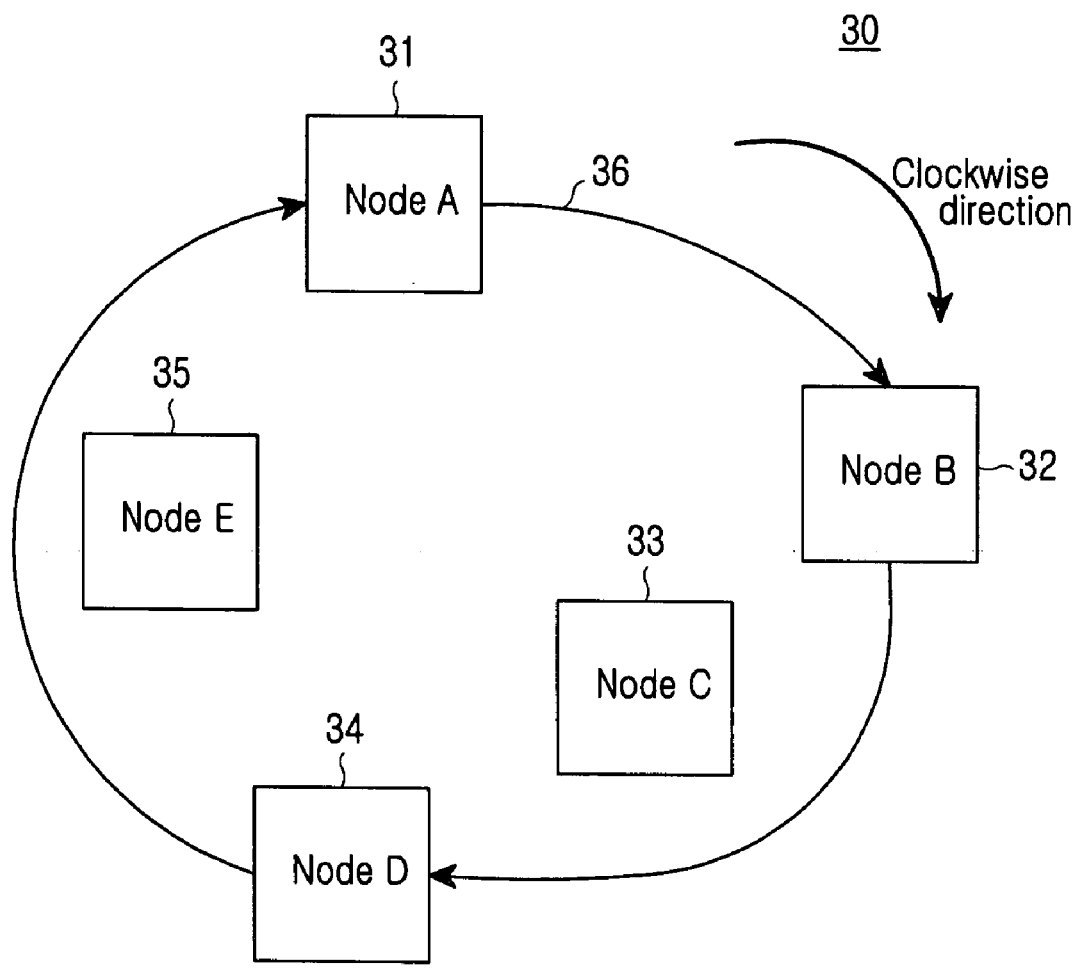
FIG. 3 is a block diagram illustrating a conventional method for assigning wavelengths in a ring communication network including five nodes.
Figure 4:
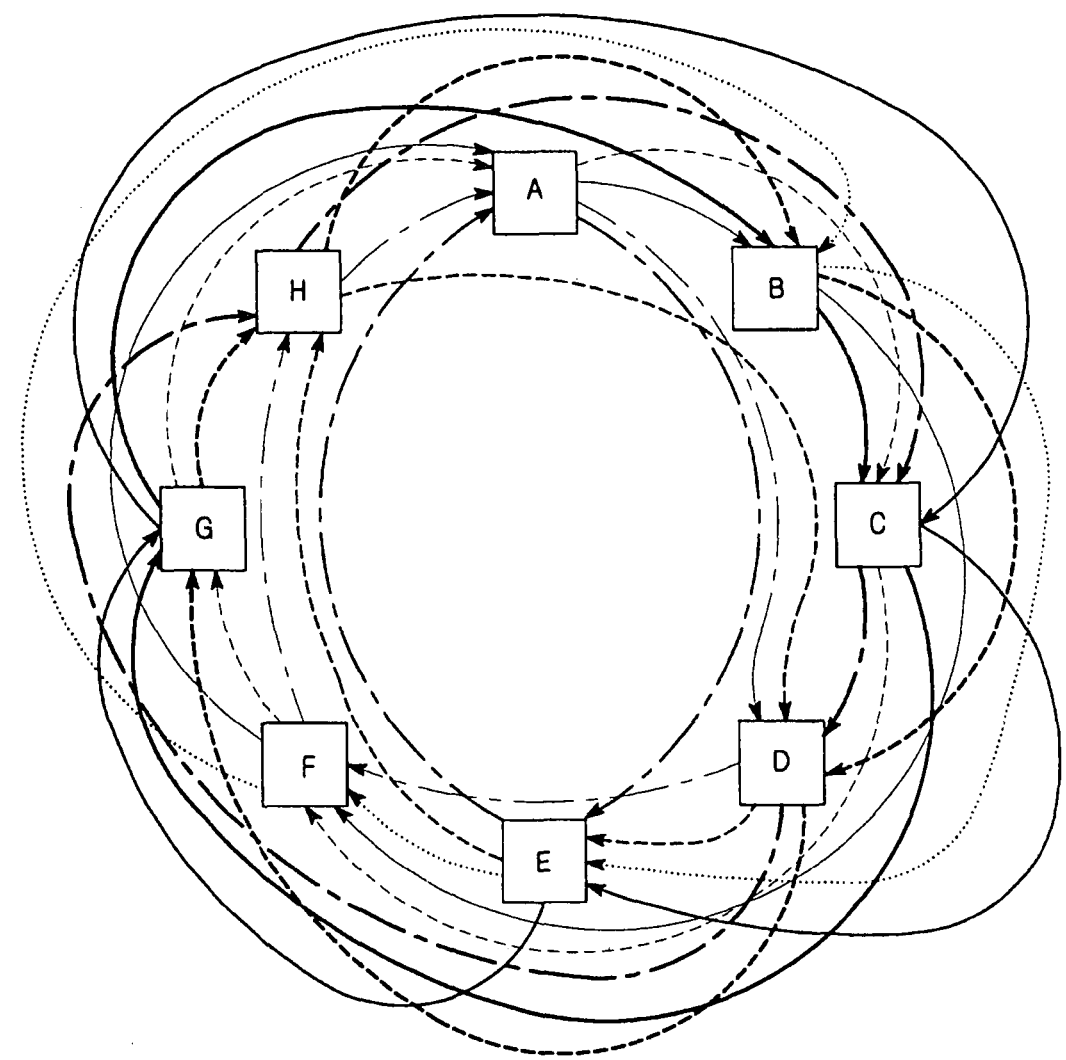
FIG. 4 is a diagram illustrating a method for assigning wavelengths in a ring communication network when the number of nodes is 8, according to an embodiment of the present invention.
Figure 5:
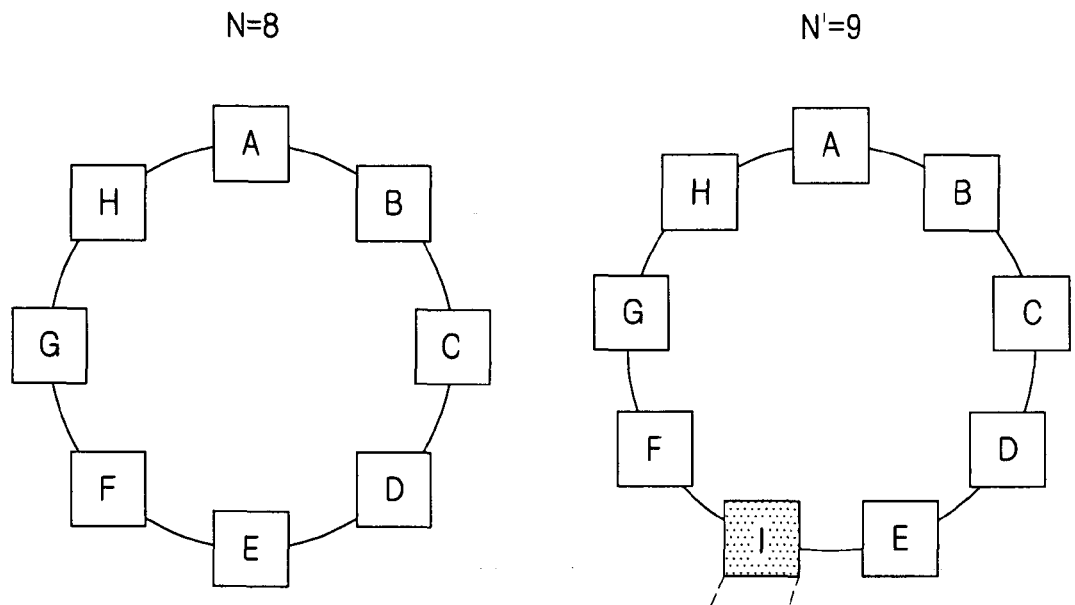
FIG. 5 is a diagram illustrating a method for assigning wavelengths in a ring communication network when the number of nodes is increased from 8 to 9, according to an embodiment of the present invention.

A preferred embodiment of the present invention will be described in detail with reference to FIGS. 4 and 5. In the drawings, the same or similar elements are denoted by the same reference numerals even though they are depicted in different drawings. For the purposes of clarity and simplicity, a detailed description of known functions and configurations incorporated herein will be omitted as it may make the subject matter of the present invention unclear.

A WDM-type wavelength assignment method according to the present invention is performed based on the following basic principle.

Basic Principle

1. Optical paths are formed as uniformly as possible using each wavelength.

2. Each wavelength should be assigned exactly once in the entire optical fiber link. This requirement is to improve the efficiency of utilizing wavelengths.

As mentioned in the description of the conventional wavelength assignment method, when the number of nodes is N, the entire number of optical paths to be formed is N(N−1). In addition, the minimum number of wavelengths needed to assign one optical path between each two nodes in a WDM ring communication network, is $(N^2-1)/8$ in the case where N is an odd number, $N^2/8$ in the case where N is an even number and a multiple of 4, and $(N^2+4)/8$ in the case where N is an even number and not a multiple of 4.

The method of assigning wavelengths and setting optical paths according to one embodiment of the present invention classifies the WDM ring communication networks into three cases: (1) when the number of nodes is an even number, (2) when the number of the nodes is increased, and (3) for recovery from network-cut failures.

I. A Method of Assigning Wavelengths and Setting Optical Paths when the Number of Nodes is an Even Number When the number of nodes N is an even number, a method is used such that after a wavelength assignment is performed for a communication network where the number of nodes is (N−1), that is, odd, the number of nodes is increased.

1. A matrix representing a wavelength assignment when the number of nodes is (N−1) is formed.

2. A node is added at any position to generate a new column in position corresponding to the added node, extending the number of nodes, and then "X" is written in each location of the added column.

3. N/2 rows are added.

4. Tracking to the left from the added column, a first encountered numeral for each row is selected. That is, a numeral on the left nearest to each row of the added column is selected, and the selected numeral is increased by 1.

5. Numerals 1, 2 . . . N/2 are written sequentially in the added rows of the added column. Accordingly, for each added row, a number of Xs equal to the number of hops corresponding to the written numeral minus 1 are written in positions next to the added column.

6. Shifting one by one to the right in each added row from the added column, a numeral of the numerals 1, 2, . . . N/2, unused in the corresponding column, is written in an empty position. Accordingly, for each added row, a number of Xs equal to the number of hops corresponding to the written numeral minus 1 are written in positions next to the added column.

Illustratively, when this method is applied to a communication network having 8 nodes, an optical-path setting matrix is obtained as shown in the following table 10. This is also schematically shown in FIG. 4. In this example, a node E is added between nodes D and F.

TABLE 10

|     | A | B    | C    | D    | E | F | G | H |
|-----|---|------|------|------|---|---|---|---|
| W1  | 1 | 3->4 | X    | X    | X | 3 | X | X |
| W2  | 2 | X    | 2->3 | X    | X | 1 | 2 | X |
| W3  | 3 | X    | X    | 1->2 | X | 2 | X | 1 |
| W4  | X | 1    | 3->4 | X    | X | X | 3 | X |
| W5  | X | 2    | X    | 2->3 | X | X | 1 | 2 |
| W6  | X | X    | 1    | 3->4 | X | X | X | 3 |
| W7  | X | 3    | X    | X    | 1 | 4 | X | X |
| W8  | X | X    | 2    | X    | 2 | X | 4 | X |
| W9  | X | X    | X    | 1    | 3 | X | X | 4 |
| W10 | 4 | X    | X    | X    | 4 | X | X | X |

1. A matrix representing a wavelength assignment when the number of nodes is (8-1) is formed.

2. A node E is added between nodes D and F to generate a new column in position corresponding to the added node, extending the number of nodes, and then "X" is written in each row of the added column.

3. 8/2 rows (W7, W8, W9, W10) are added.

4. Tracking to the left from the added column, a first encountered numeral for each row is selected. That is, a numeral on the left nearest to each row of the added column is selected, and then the selected numeral is increased by 1. Regarding a wavelength W1, a numeral 3 is selected, and therefore its value is modified to 4.

5. Numerals 1, 2, 3 and 4 are sequentially placed in positions of the added rows W7, W8, W9, and W10, corresponding to the added column E, and, for each added row, a number of Xs equal to the number of hops corresponding to the newly placed numeral minus 1 are written in positions next to the added column.

6. Shifting one by one to the right in each added row from the added column, a numeral of 1, 2, . . . N/2, unused in the corresponding column, is written in an empty position. Accordingly, a number of Xs equal to the number of hops corresponding to the written numeral minus 1 are written in positions next to the added column.

II. A Method for Setting Optical Paths and Assigning Wavelengths when the Number of Nodes is Increased The following description is provided for a method wherein, in a ring communication network with any number of nodes, after a WDM ring communication network with a minimum number of wavelengths is implemented and when a new node is added, a communication network is reconfigured with a minimum number of wavelengths.

II-1. When the Number of Nodes is Increased from an Odd Number to an Even Number The above-mentioned method (I. Method of assigning wavelengths and setting optical paths when the number of nodes is an even number) is applied.

II-2. When the Number of Nodes is Increased from an Even Number to an Odd Number 1. A matrix is defined that represents a wavelength assignment for (N−1) number of nodes.

2. A node is added at any position to generate a new column in a position corresponding to the added node, extending the nodes, and then "X" is written in each row of the added column.

3. Tracking to the left from the added column, a first encountered numeral for each row is selected. That is, a numeral on the left nearest to each row of the added column is selected, and the selected numeral is increased by 1.

4. If the selected numeral is more than the maximum number of hops (Lmax=(N−1)/2) after being increased, the selected numeral is modified to a numeral corresponding to the number of hops up to the added column, and then the number of hops from the added column to a numeral on the right nearest to the added column is written in each corresponding row of the added column.

5. X is written in each empty place of the added column.

The following table 11 represents an optical-path setting matrix obtained by applying such a method to a communication network where the number of nodes N is increased from 8 to 9. This is also shown schematically in FIG. 5. In this example, a node I is added between nodes E and F.

TABLE 11

|     | A | B    | C    | D    | E    | I | F | G | H |
|-----|---|------|------|------|------|---|---|---|---|
| W1  | 1 | 4->4 | X    | X    | X    | 1 | 3 | X | X |
| W2  | 2 | X    | 3->4 | X    | X    | X | 1 | 2 | X |
| W3  | 3 | X    | X    | 2->3 | X    | X | 2 | X | 1 |
| W4  | X | 1    | 4->3 | X    | X    | 2 | X | 3 | X |
| W5  | X | 2    | X    | 3->4 | X    | X | X | 1 | 2 |
| W6  | X | X    | 1    | 4->2 | X    | 3 | X | X | 3 |
| W7  | X | 3    | X    | X    | 1->2 | X | 4 | X | X |
| W8  | X | X    | 2    | X    | 2->3 | X | X | 4 | X |
| W9  | X | X    | X    | 1    | 3->4 | X | X | X | 4 |
| W10 | 4 | X    | X    | X    | 4->1 | 4 | X | X | X |

For reference, the following tables 12 through 15 show the results of the wavelength assignment according to the above described embodiments of the present invention (referred to collectively as "ABC wavelength assignment method") when the number of nodes is increased from 5 to 8.

TABLE 12

ABC wavelength assignment method when the number of nodes is 5

|    | A | B | F | G | H |
|----|---|---|---|---|---|
| W1 | 1 | 2 | X | 2 | X |
| W2 | 2 | X | 1 | 1 | 1 |
| W3 | X | 1 | 2 | X | 2 |

TABLE 13

ABC wavelength assignment method when the number of nodes is 6 (Node C is added between nodes B and F)

|    | A | B | C | F | G | H |
|----|---|---|---|---|---|---|
| W1 | 1 | 3 | X | X | 2 | X |
| W2 | 3 | X | X | 1 | 1 | 1 |
| W3 | X | 2 | X | 2 | X | 2 |

TABLE 13-continued

ABC wavelength assignment method
when the number of nodes is 6
(Node C is added between nodes B and F)

|    | A | B | C | F | G | H |
|----|---|---|---|---|---|---|
| W4 | 2 | X | 1 | 3 | X | X |
| W5 | X | 1 | 2 | X | 3 | X |
| W6 | X | X | 3 | X | X | 3 |

TABLE 14

ABC wavelength assignment method
when the number of nodes is 7
(Node D is added between nodes C and F)

|       | A | B | C | D | F | G | H |
|-------|---|---|---|---|---|---|---|
| <W1>  | 1 | 2 | X | 2 | X | 2 | X |
| <W2>  | 3 | X | X | 1 | 1 | 1 | 1 |
| W3    | X | 3 | X | X | 2 | X | 2 |
| W4    | 2 | X | 2 | X | 3 | X | X |
| W5    | X | 1 | 3 | X | X | 3 | X |
| <W6>  | X | X | 1 | 3 | X | X | 3 |

TABLE 15

ABC wavelength assignment method
when the number of nodes is 8
(Node E is added between nodes D and F)

|    | A | B | C | D | E | F | G | H |
|----|---|---|---|---|---|---|---|---|
| W1 | 1 | 1 | 2 | X | 2 | X | 2 | X |
| W2 | 2 | X | 3 | X | X | 1 | 1 | 1 |
| W3 | X | 3 | X | X | 1 | 2 | X | 2 |
| W4 | X | X | 1 | 1 | 3 | X | X | 3 |
| W5 | 3 | X | X | 2 | X | 3 | X | X |
| W6 | X | 2 | X | 3 | X | X | 3 | X |
| W7 | 4 | X | X | X | 4 | X | X | X |
| W8 | X | X | 4 | X | X | X | 4 | X |

III. The Number of Wavelengths Required for Recovery from Network-cut Failures

Optical communication networks typically handle a large quantity of data, and therefore there is a need to prepare a backup device and channel to swiftly recover from a network-cut failure generated in any link. In the following embodiment of the present invention, the number of backup wavelengths required for such a recovery from network-cut failures is equal to the number of wavelengths required when the longest paths (a path having the maximum number of hops) are excluded.

In more detail, referring to table 10 above, and assuming that a link from the node C to the node D is cut when the number of nodes is 8, a backup is required for each of wavelengths W2, W3, W5, W6, W7, and W8, except wavelengths W1, W4, W9, and W10 that each include the maximum number of hops 4, and therefore six additional wavelengths are needed.

Meanwhile, in the above description, it is assumed that a network for forming the optical paths includes two optical fibers, on which optical signals travel in the clockwise and counterclockwise directions, respectively.

The above-described matrixes represented by tables 1 through 15 express an optical-path setting arrangement for a clockwise-direction optical fiber. An optical path in the counterclockwise direction can be considered as twinned with an optical path in the clockwise direction. That is, numerals in a row are rotated in the clockwise direction. For example, when an optical path is set in the clockwise direction as a node A → a node D, an optical path is set in the counterclockwise direction as the node D → the node A.

In more detail, referring to table 10, numerals in the first and third rows are written in the sequence 1 → 4 → 3 and 3 → 2 → 2 → 1, respectively. Therefore, the numerals are rotated in the clockwise direction to be replaced with numerals in the sequence 3 → 1 → 4 and 1 → 3 → 2 → 2.

As apparent from the above description, in the present invention, optical paths are set and wavelengths are assigned using a minimum number of wavelengths in a WDM ring communication network, thereby improving the transmission capacity in the network.

In addition, when any node is added to an already-existing ring network, inter-node optical paths can be formed using a minimum number of wavelengths, minimizing change in the configuration of the already-existing ring network.

Although the preferred embodiments of the present invention have been disclosed for illustrative purposes, those skilled in the art will appreciate that various modifications, additions and substitutions are possible, without departing from the scope and spirit of the invention. For example, the present invention is not applied only to a ring network composed of just two optical fibers, but also to any type of ring network.

Accordingly, the scope of the present invention should not be limited to the description of the preferred embodiment, but defined by the accompanying claims as well as equivalents thereof.

What is claimed is:

1. A method for assigning a predetermined wavelength between two different nodes in a wavelength division multiplexing (WDM) ring communication network that has an N number of nodes and at least one pair of optical fibers sequentially connecting the N number of nodes, the method comprising the steps of:

forming a matrix that represents optical-path configuration and wavelength assignment for an N−1 number of nodes;

extending the matrix by adding a column at any position of the matrix and then assigning X to locations of the added column;

adding an N/2 number of rows in the matrix;

tracking along each row toward the left, from the added column, to find a first encountered numeral and increasing the found numeral by one;

assigning numerals 1, 2, . . . , N/2 sequentially to locations corresponding to the added column in the added rows, and assigning X to locations next to the numeral-assigned locations, the number of X-assigned locations being equal to a hop-number corresponding to the assigned numeral minus 1; and tracking along each of the added rows toward the right to find an empty location and assign thereto a numeral not used, among the numerals 1, 2, . . . , N/2, in the same column as the empty location and assigning X to locations next to the empty location, the number of X-assigned locations being equal to a hop-number corresponding to the assigned numeral minus 1, where N being an even number, and X representing that an optical path of the corresponding node is not formed, wherein the matrix provides a new path between the N number of nodes when a failure occurs in any one node of WDM ring communication network.

2. The method as set forth in claim 1, wherein the step of forming the matrix comprises the steps of:

preparing the matrix having rows and columns, a number of rows being equal to a number of nodes (N−1), a number of columns being equal to a lower limit value W of the number of wavelengths required when the number of nodes is N−1;

assigning a set of numerals {1, 2, ..., Lmax} sequentially to locations of a first column of the matrix, while assigning X to a location where no numeral is assigned, and assigning X to locations next to a numeral-assigned locations along each row, the number of X-assigned locations being equal to a hop-number corresponding to the assigned numeral minus 1; and shifting one by one toward the right in the matrix to assign a rotated set of numerals sequentially to each column, the rotated set of numerals being obtained by rotating a set of numerals used in the previous column, and assigning X to the remaining locations.

3. The method as set forth in claim 2, wherein when the number of nodes is N−1, a lower limit value W is given by:

$$W=\{(N-1)^2-1\}/8.$$

4. A method for assigning a predetermined wavelength between two different nodes, in case where a number of nodes is increased, in a wavelength division multiplexing (WDM) ring communication network that has an N number of nodes, where N is an number of nodes after a new node has been added and at least one pair of optical fibers sequentially connecting the N number of nodes, the method comprising the steps of:

expressing, by a matrix, optical-path configuration and wavelength assignment of the network before extending the number of nodes;

extending the matrix by adding a column to extend the number of nodes at a corresponding position of the matrix and then assigning X to the added column;

tracking along each row toward the left, from the added column, to find a first encountered numeral and increasing the found numeral by one, and, if the numeral exceeds a maximum number of hops (Lmax=(N−1)/2)) after being increased, modifying the numeral to a hop-number from a column corresponding to the first-encountered numeral to the added column;

tracking along each row toward the right, from the added column, to find a firstly encountered numeral and assigning, to each row of the added column, a hop-number from the added column to a column corresponding to the firstly-encountered numeral; and assigning X to an empty location of the added column, where N being an odd number, and X representing that an optical path of the corresponding node is not formed, wherein, the matrix provides a new path between N number of nodes when a failure occurs in any one node of WDM ring communication network.

* * * * *